United States Patent [19]

Belloni Cofler et al.

[11] Patent Number: 4,745,094

[45] Date of Patent: May 17, 1988

[54] MONO- OR MULTI-METAL MICROAGGREGATES, A METHOD FOR THEIR PREPARATION AND THEIR APPLICATION IN THE CATALYSIS OF THE PHOTOREDUCTION OF WATER

[75] Inventors: Jacqueline Belloni Cofler, Palaiseau; Jean-Louis Marignier, Meudon; Marie-Odile Delcourt Euverte, Magny-les-Hameaux; Michele Minana Lourseau, Rambouillet, all of France

[73] Assignee: Centre National de la Recherche Scientifique, Paris, France

[21] Appl. No.: 909,055

[22] Filed: Sep. 18, 1986

Related U.S. Application Data

[63] Continuation-in-part of Ser. No. 744,445, Jun. 13, 1985, Pat. No. 4,629,709.

[30] Foreign Application Priority Data

Jun. 13, 1984 [FR] France ................. 84 09196

[51] Int. Cl.$^4$ ............................................. B01J 37/34
[52] U.S. Cl. ......................................... 502/5; 502/522; 204/157.44
[58] Field of Search ................ 502/5, 522; 204/157.44

[56] References Cited

U.S. PATENT DOCUMENTS

| | | | |
|---|---|---|---|
| 2,905,608 | 9/1959 | Noddings et al. | 502/5 |
| 4,062,696 | 12/1977 | Ducote | 502/5 |
| 4,587,226 | 5/1986 | Sasaki et al. | 502/5 |
| 4,629,709 | 12/1986 | Belloni Cofler et al. | 502/5 |

*Primary Examiner*—Carl F. Dees
*Attorney, Agent, or Firm*—Sughrue, Mion, Zinn, Macpeak, and Seas

[57] ABSTRACT

Mono- or multi-metal microaggregates in a monodisperse phase in a solid or liquid medium and of a size uniformly less than 5 nm. The microaggregates are obtained by irradiation of a metal salt or a mixture of salts, by means of an ionizing radiation source, comprising dissolving a metal salt or a mixture of metal salts, in an appropriate solvent, in the presence of an oxidizing radical scavenger, and a surfactant, a support or both a surfactant and a support, and then carrying out irradiation. The metal microaggregates are useful for catalysis of various reactions, in particular, the photoreduction of water.

19 Claims, No Drawings

4,745,094

MONO- OR MULTI-METAL MICROAGGREGATES, A METHOD FOR THEIR PREPARATION AND THEIR APPLICATION IN THE CATALYSIS OF THE PHOTOREDUCTION OF WATER

CROSS-REFERENCE TO RELATED APPLICATIONS

This is a continuation-in-part application of U.S. patent application Ser. No. 744,445 filed June 13, 1985 now U.S. Pat. No. 4,629,709.

FIELD OF THE INVENTION

The present invention relates to new metal microaggregates, and more particularly to new monodisperse phases of mono- or multi-metal aggregates, a method for their preparation by the radiolytic reduction of metal salts, and to their application as reaction catalysts.

BACKGROUND OF THE INVENTION

Various physical, chemical or physico-chemical methods are known for preparing dispersed metal phases. For example, the metal can be ground mechanically and then dispersed in the selected medium, or a metal which has been previously vaporized under a vacuum can be condensed onto a support. Also, such can be carried out by ion reduction with molecular hydrogen at a high temperature, or by attack with a base on a metal alloy, for example, for the preparation of Raney nickel. The physico-chemical methods can consist of reducing metal ions at the surface of an electrode, carrying out a discharge in a metal ion solution or carrying out a photochemical reduction.

However, these known methods do not yield the metal in the state of microaggregates uniformly dispersed in either a liquid or solid medium, and having a size of less than a few nanometers.

For example, German Pat. No. 1,154,442 describes the photochemical decomposition of an organic metal compound in a solution of an ethylene polymer in a hydrocarbon or an either in order to obtain a colloidal dispersion of lead, zinc, nickel or iron. As described in U.S. Pat. No. 4,264,421, a photochemical method also gives a metal deposit on a support. U.S. Pat. No. 1,805,199 describes the thermal decomposition of a metal derivative yielding colloidal lead or nickel particles which, in solution, exhibit the Tyndall effect characteristic of a particle size greater than 100 nm. German Pat. No. 1,717,152 describes the preparation of a nickel-based catalyst by high temperature vaporization of the metal in order to obtain particles of a size of between 30 and 45 nm.

The use of ionizing radiation has also been suggested ($\gamma$ or $\chi$ photons or accelerated electrons) in order to carry out in situ reduction of noble metal salts using solvated electrons formed in the solvent. This method has the advantage of producing solvated electrons at all points of the liquid, even inside the micropores of an alveolar support which is appropriately used. The metals thus prepared belong to the group of noble metals (Ir, Pt, Pd, Rh, Ru, Au, Ag) but only Ir, Pt, Au and Ag have been obtained in a divided form. Further, the method does not enable other metals, such as nickel, which are also often used in various catalysts for numerous reactions, to be obtained in a stable and very divided form. For example, U.S. Pat. No. 3,826,726 describes the reduction of metal ions, but a precipitate of particles having a large size is obtained.

These difficulties result from the fact that the non-noble metals are characterized by a redox potential which is more favorable to corrosion and which is further shifted towards unfavorable values for quasi-atomic aggregates. The production of metals in a state of extreme division can only succeed by avoiding, at least partially, the reverse reaction of corrosion during the nucleation phase of the aggregate. Beyond a certain size, the particles are stabilized with respect to the surrounding medium.

Another difficulty appears in the case of multivalent ions for which progressive radiolytic reduction is involved. Although this reduction method has the advantage of ensuring the dispersion of the native metal atoms and of enabling control of their aggregation, it has, like any method based on the reduction of ions, the risk of oxidation on the return of the intermediate state or states, which risk is in addition to the corrosion of the aggregates at the very first stage of their growth.

SUMMARY OF INVENTION

The object of the present invention is to prepar monodisperse phases of mono-or multi-metal microaggregates possessing specific physico-chemical characteristics, and which are useful in particular as reaction catalysts.

The object of the invention is therefore monodisperse phases of mono- or multi-metal microaggregates, comprising (1) a non-noble metal, such as nickel, cobalt, iron, zinc, antimony, tin, bismuth, or lead, (2) alloys of non-noble metals with noble or non-noble metals, such as platinum, palladium, gold, silver, copper, iridium, rhodium, osmium, ruthenium and mercury, (3) noble metals, or (4) alloys of noble metals, each of a size less than 5 nm, and which are obtained without chemical reducing agents, by in situ reduction of metal salts by means of ionizing radiation. However, mono-metal microaggregates of gold, silver, platinum and iridium are not included in the scope of the invention.

A further object of the invention is the application of the mono- or multi-metal microaggregates as reaction catalysts and in particular for the photoreduction of water into hydrogen.

The invention further relates to a method enabling the easy preparation by radiolytic means of mono- or multi-metal microaggregates in the form of uniform monodisperse phases in a liquid or solid medium.

The method in accordance with the invention is characterized by irradiating a metal salt, or a mixture of salts, by means of an ionizing radiation source and comprises dissolving a metal salt or a mixture of metal salts in a suitable solvent, in the presence of an oxidizing radical scavenger, and a surfactant and/or a support, and then carrying out irradiation.

DETAILED DESCRIPTION OF INVENTION

The oxidizing radical scavenger used in the method in accordance with the invention is preferably a primary or secondary alcohol such as isopropanol, or a formate such as an alkaline metal formate. It may be preferable to select the formate of the metal which it is desired to reduce, for example, nickel formate. This compound is used to scavenge the oxidizing radicals formed in the solution. In effect, in addition to the solvated electrons, radiolysis of the solutions produces radicals, such as the OH• radical in the case of water, which can in return oxidize part of the atoms resulting from reduction with the solvated electrons. The addition of a primary or secondary alcohol (RHOH) which reacts rapidly with the OH• radicals to give new reducing ROH• radicals, enables the metal yield to be increased. The HCOO$^-$ formate ion can also be used as a radical scavenger. In this case the reaction product is the COO$^-$radical which also possesses excellent reducing properties.

The concentration of the radical scavenger is determined according to the quantity of the metal to be produced, and therefore according to the necessary dose. The concentration of the radical scavenger can, for example, be between $10^{-2}$ and 1 mol/l.

The metal yield, for a given dose of ionizing radiation, is higher for higher concentrations of metal salts. However, if the concentration is too high, the greater ionic strength of the medium enhances the aggregations of colloids and the particles obtained are then of a larger size.

The solvent used is selected depending upon the metal salt and can, for example, be water, acetonitrile, ammonia, tetrahydrofuran, ethylenediamine or an alcohol. As necessary, a common surfactant can also be used.

As indicated above, the method is carried out in the presence of a surfactant and/or a support, that is, in a liquid and/or solid medium. The surfactant used is preferably polyvinyl alcohol at a concentration (monomeric) equal to several times, for example, 10 times, that of the metal atoms. Instead of the surfactant, a suitable support, such as silicas, resins, oxides ($Al_2O_3$, $RuO_2$, $TiO_2$), zeolites, carbon or insoluble salts, such as strontium titanate or cadmium sulfide, can be used and the metal microaggregates are then deposited on this support.

The pH of the reaction medium is preferably higher than 6.0, and the most appropriate value can be selected taking into account the other conditions such as the surfactant concentration. When the surfactant concentration is relatively high the pH can be relatively low, i.e., from 6 to 8; with a lower surfactant concentration, the pH is preferably higher. However, mono- or multimetal microaggregates of gold, silver, platinum, palladium and iridium can be prepared at a lower pH value, and in this case, the pH can be lower than 6.0.

In accordance with one means of using the method of the invention, when the surfactant concentration is low, i.e., 5 to 10 times that of the metal atoms, a basic medium is preferably used and the pH can, for example, be brought to 9 or more, and preferably between 10 and 11, by the addition of sodium hydroxide or ammonia. However, the pH must not be too high in order to avoid precipitation of the metal hydroxide from hydrolysis by the solvent.

On the other hand, too low a pH (acidic or weakly basic) is disadvantageous to the stability of the metal microaggregates. In effect, any corrosion or reoxidation of the native metal from the action of the oxidizing agents present in the medium must be avoided. The solvated H$^+$ proton can have an oxidizing action and it is known that the formation of a divided metal phase from the corresponding salt causes progressive acidification of the medium. Also, the metal aggregates do not form if the medium is initially acidic or weakly basic, unless the concentration of the metal is considerably increased, which can be a disadvantage for the control of nucleation.

By working in basic pH conditions in the presence of a surfactant such as polyvinyl alcohol and an oxidizing radical scavenger such as isopropanol, the yield of the production of microaggregates of metals can be improved considerably.

It can be preferable, in accordance with the invention, to facilitate the nucleation of metal atoms such as Ni, Co, Fe, Cu or Hg by producing them in the presence of microaggregates of noble metal such as palladium or platinum, the preparation of which is, moreover, well known. These metals, for example, platinum or palladium, can be added in small quantities, for example, from 0.1 to 2 % in atoms of the metal to be reduced. Greater quantities, above 2%, can be used with the object of producing alloys containing platinum or palladium. They can be prepared by first adding a suspension of previously reduced palladium or platinum, or by carrying out the radiolytic reduction of a mixture of salts. In this manner and depending upon the quantity of noble metal added, subcolloidal solutions of nickel are obtained containing a few $^o/_{oo}$ of Pt or Pd which are located at the heart of the aggregate or are distributed as in an alloy.

In a similar manner, Ni, Co, Fe, Pb, Hg, Cu, Zn, Cd alloys, with all proportions of Au, Pd or Pt, and Fe/Cu, Ni/Ag, Ni/Cu, Ni/La, Pd/Ag/Au or Pd/Ag/Cu alloys can be prepared. Analysis of electron micro-scattering diagrams shows that these atoms are evenly arranged in the sites of the system, as in a solid solution when the metals are miscible. This regularity in the arrangement of the atoms in the case of a bimetallic microaggregates is particularly remarkable.

The alloy structure depends on the starting metal salts composition of the irradiated solution. For example, in the case of Cu/Pd, (1) when the composition of the starting solution is $Cu^{2+}=90\%$ and $Pd^{2+}=10\%$, the resulting structure, which corresponds to the $Cu_3Pd$ stoichiometry, is such that the Pd atoms are at the vertex of a cubic mesh, while the Cu atoms are at the center of the faces (Ll$_2$ type super-lattice); or (2) when the composition of the starting solution is $Cu^{2+}=50\%$ and $Pd^{2+}=50\%$ the resulting super-lattice (Ll$_0$ type) corresponds to the CuPd stoichiometry. Such super-lattices are also observed, for example, in Cu/Au and Ni/Pt alloys obtained by the method according to the invention.

It is worth noting that such ordinated alloys are obtained at ambient temperature, while known alloys are obtained at high temperatures, near the melting point of the metals, and the particles thus obtained have no ordinated structure but comprises a surface with a higher concentration in one of the elements, according to usual metallurgical processes.

In accordance with an alternative embodiment of the method of the invention, in particular in the case of nickel, it is preferable to carry out irradiation in the presence of oxygen. In effect, the addition of a base to the solution, associated with the presence of oxygen at reduced pressure, enables the native atoms to be protected from oxidation in return by H$^+$, and prevents, through complexing with the oxygen added under reduced pressure, the reverse reaction of the intermediate valence with the medium. In the case of a low concentration solution of a metal salt (a few $10^{-3}$ mol/l) the metal is not formed under irradiation in a basic medium and in the presence of an inert gas or under a vacuum. Nor in the presence of air does the reduction take place due to the reaction of the reducing agents and the solvated electrons with the oxygen. To the contrary, the addition of oxygen at a pressure of approximately 50 torrs enables the metal colloid to form. The remaining oxygen must be removed after irradiation so as to not harm the stability of the colloid.

Finally, a transparent brown solution which is characteristic of subcolloidal solution is obtained. For certain metals (Cu, Ni, Pb, Co, and alloys above a certain proportion of these metals), the color disappears on contact with air, which signifies the reoxidation of the metal. The solutions must therefore be kept under a vacuum or under an inert atmosphere (nitrogen, argon).

In accordance with another embodiment of the method of the invention, it may be preferable to greatly increase the concentration of the surfactant. In this case, radiolytic reduction can, as necessary, be carried out at a relatively low pH, for example, close to 7, without it being necessary to add a base to the solution. For example, for a solution containing polyvinyl alcohol at a concentration of 0.2 mol/l as the tensioactive agent, and the concentration of $Ni^{2+}$ being $2 \times 10^{-3}$ mol/l, the reduction of the metal is carried out under a vacuum in an initially neutral medium.

The metal salt concentration can be between $10^{-4}$ and $10^{-1}$ mol/l, and preferably between $10^{-3}$ and $10^{-2}$ mol/l approximately. It is preferable, in particular in the case of nickel, to use a metal salt concentration of between $10^{-2}$ and $10^{-1}$ mol/l in order to facilitate the aggregation of the metal. The microaggregates of nickel can then be formed in the presence of a radical scavenger and a surfactant or a support with the addition of a base, oxygen, platinum or palladium. For example, the solution can contain nickel salt ($5 \times 10^{-2}$ mol/l), polyvinyl alcohol (a few $10^{-1}$ mol/l as a monomer) and isopropanol at a concentration in relation with the desired quantity of nickel (for example, $10^{-2}$ to $10^{-1}$ mol/l). The irradiation yields one nickel atom for approximately 200 eV of energy absorbed (50 eV in the case of the formate).

The metal salt can be selected from among the conventional salts of the metals which are sought to be reduced. For example, a metal sulfate, chloride, perchlorate or formate may be used. Formate has the advantage of providing an anion which plays the role of radical scavenger.

Irradiation is carried out using any conventional source of ionizing radiation, at doses which are dependent on the quantity of metal and which can, for example, be on the order of 50 to 700 eV per atom of metal. For example, a (cobalt 60) radiation source of from 0.2 to 0.5 M.rad/h can be used for 1 to 20 hours. The ferromagnetic particles (Fe, Co, Ni) can be separated from the solution by a magnetic field.

As indicated above, the method of the invention enables the preparation of monodisperse phases of mono- or multi-metal microaggregates, characterized by the size of the microaggregates, which is less than about 5 nm and preferably less than approximately 3 nm, and by their uniform dispersion in the solution or on the support, even inside the micropores of an alveolar support.

In addition, metal microaggregates or alloys of noble or non-noble metals in a stable form may be obtained which can be used for various applications.

The microaggregates obtained can be used as reduction catalysts for all of the reactions normally catalyzed by Raney nickel. They can be used either alone or deposited on a support, in particular for the photoreduction of water into hydrogen.

It is known that the efficiency of a heterogenous catalyst depends essentially on the rate of the reversible reactions with the molecules at the interface between phases, and consequently on the degree of dispersion of the catalyst. It is therefore particularly useful to be able to use catalysts, in particular metal catalysts, which are finely divided (in particular in the microaggregate state) and in a stable and homogenous form.

With regard to the photosensitized dissociation of water with the object of converting and stocking solar energy, it is known that the use of a catalyst is indispensable in order to carry out the concerted transfer of several electrons. It can be noted that the activity of the nickel microaggregates in accordance with the present invention is comparable to that of the best known catalysts in this reaction. Thus, for a same concentration, the nickel microaggregates have activity equal to approximately 80% of that of platinum, whereas the activity of Raney nickel is practically nil. The microaggregates in accordance with the invention are therefore particularly advantageous from an economic standpoint.

The examples given below illustrate the invention in greater detail without limiting the scope thereof.

In the case of preparation of a catalyst for dry use, the support is impregnated to the extent of the volume of its pores with the solution of metal ions and the solvent is evaporated after irradiation. In the case of a supported catalyst, either the divided support or the surfactant (polyvinyl alcohol) is added to the ion solution.

EXAMPLE 1

A subcolloidal solution of nickel was prepared as indicated below at a concentration of $2 \times 10^{-3}$ mol/l.

A commercial solution of nickel sulfate at the selected concentration ($2 \times 10^{-3}$ mol/l which is 0.12 g/l) was diluted. Polyvinyl alcohol was added in an amount of more than 10 time the monomer than metal atoms ($4.5 \times 10^{-2}$ mol/l which is 2 g/l).

Isopropyl alcohol at a concentration of 0.28 mol/l and then palladium chloride (concentration $2 \times 10^{-4}$ mol/l) were added to this solution. A few drops of sodium hydroxide 0.5 M were then added to bring the pH to approximately 10.6, the solution was then degassed by pumping and irradiated with a (cobalt 60) $\gamma$ radiation source at a rate of 700 eV per atom of metal (which is $3.3 \times 10^{20}$ eV/g). The irradiation was carried out for approximately 15 hours.

In this manner, a transparent brown solution was obtained which had the characteristic of a subcolloidal solution and which remained stable and did not form a sediment even after storage for several months under an inert atmosphere. Electronic microscopic examination showed that the size of the microaggregates was less than 3 nm. The solvent was able to be removed by evaporation for the preparation of a catalyst for non-aqueous use.

EXAMPLES 2-16

By proceeding as in Example 1, in the presence or absence of palladium chloride, or by replacing it with copper sulfate (Ex. 8 and 9) and as appropriate, without the addition of sodium hydroxide, metal microaggregates were prepared under the conditions indicated in the following table.

| Example No. | Metal Salt Conc. mol/l | | pH | Cometal Conc. mol/l | | Alcohol mol/l | Formate mol/l | P.V.A. mol/l | Dose $10^{20}$ eV/g |
|---|---|---|---|---|---|---|---|---|---|
| 1 | NiSO$_4$ | $2 \times 10^{-3}$ | 10.6 | PdCl$_2$ | $2 \times 10^{-4}$ | 0.28 | — | $4.5 \times 10^{-2}$ | 3.3 |
| 2 | RhCl$_3$ | $10^{-3}$ | 8.9 | — | | 0.56 | — | $10^{-2}$ | 0.72 |
| 3 | NiSO$_4$ | $3 \times 10^{-3}$ | 10.2 | PdCl$_2$ | $10^{-5}$ | 0.8 | — | 0.14 | 3.3 |
| 4 | NiSO$_4$ | $2 \times 10^{-3}$ | 8 | — | | 0.56 | — | (*) | 3.3 |
| 5 | CoSO$_4$ | $10^{-3}$ | 9.2 | PdCl$_2$ | $5 \times 10^{-5}$ | 0.56 | — | $9 \times 10^{-2}$ | 1.32 |
| 6 | HgCl$_2$ | $10^{-3}$ | 11 | PdCl$_2$ | $10^{-4}$ | 0.56 | — | $9 \times 10^{-2}$ | 0.35 |
| 7 | CuSO$_4$ | $10^{-3}$ | 10.2 | PdCl$_2$ | $10^{-4}$ | 0.56 | — | 0.1 | 0.33 |
| 8 | FeSO$_4$ | $2 \times 10^{-3}$ | 10.4 | CuSO$_4$ | $2 \times 10^{-3}$ | 0.11 | — | 0.2 | 3.3 |
| 9 | NiSO$_4$ | $5 \times 10^{-4}$ | 6.7 | CuSO$_4$ | $5 \times 10^{-4}$ | 0.056 | — | 0.2 | 1.1 |
| 10 | CuSO$_4$ | $2 \times 10^{-3}$ | 10.4 | — | | 0.56 | — | 0.2 | 3.3 |
| 11 | PbClO$_4$ | $2 \times 10^{-3}$ | 8 | — | | 0.11 | — | $2 \times 10^{-2}$ | 0.4 |
| 12 | NiSO$_4$ | $2 \times 10^{-3}$ | 8.8 | (**) | | 0.56 | — | $9 \times 10^{-2}$ | 3.3 |
| 13 | NiSO$_4$ | $2 \times 10^{-3}$ | 6.7 | — | | 0.28 | — | 0.2 | 3 |
| 14 | NiSO$_4$ | $5 \times 10^{-2}$ | 6.7 | — | | 0.028 | — | 0.2 | 1.1 |
| 15 | NiSO$_4$ | $5 \times 10^{-2}$ | 6.7 | — | | | 0.1 | 0.55 | 3.3 |
| 16 | NiSO$_4$ | $1.5 \times 10^{-2}$ | 6.7 | — | | 0.56 | — | (*) | 1.76 |
| 17 | Zn(ClO$_4$)$_2$ | $10^{-2}$ | 12 | — | | 0.56 | — | 0.25 | 14.8 |

(*) SiO$_2$ (spherosil)
(**) Pressure O$_2$; 50 torrs

EXAMPLE 18

Bimetallic microaggregates Ni/Pt were prepared by the same process an in Example 1 above, starting from nickel sulfate solutions having a concentration between $5 \times 10^{-3}$ and $5 \times 10^{-2}$ mol/l, and hexachloroplatinic acid or potassium tetrachloroplatinate, with different ration Ni/Pt as indicated below.

Polyvinyl alcohol was used as surfactant (concentration $3 \times 10^{-1}$ mol/l) except when the microaggregates were deposited on a porous support such as silica microbeads or alumina powder.

Irradiation was carried out as described in Example 1.

| Ni/Pt | Scavenger | Support |
|---|---|---|
| 1/1 | isopropyl alcohol | — |
| 1/1 | Na formate | — |
| 5/1 | " | — |
| 10/1 | " | — |
| 100/1 | " | — |
| 3/20 | isopropyl alcohol | Al$_2$O$_3$ |
| 10/1 | " | SiO$_2$ |

EXAMPLE 19

Trimetallic microaggregates Pd/Cu/Ag were prepared by the same process as described in Example 1, from palladium chloride, copper sulfate and silver sulfate solutions (concentration: $2 \times 10^{-3}$ mol/l). Polyvinyl alcohol was used as the surfactant (concentration $1 \times 10^{-1}$ mol/l) and isopropyl alcohol as the radical scavenger. The pH value was about 6.5.

Irradiation was carried out as described in Example 1.

The study of the microaggregates obtained as indicated in the above examples, by transmission electronic microscopy, demonstrated that the diameter was about 5 nm in the case of nickel, and about 2 nm in the case of lead. Such metal microaggregates were in the form of subcolloidal solutions.

When the microaggregates were deposited on a support such as a usual support for catalysis (for example, SiO$_2$ beads), the diameter of nickel microaggregates was about 3–5 nm as measured by X-rays central scattering (small angle X-ray scattering).

While this invention has been described in detail and with reference to specific embodiments thereof, it will be apparent to one skilled in the art that various changes and modifications could be made therein without departing from the spirit and scope thereof.

What is claimed is:

1. A mono- or multi-metal microaggregate composition comprising a monodisperse phase of mono- or multi-metal microaggregates in a liquid or solid medium, wherein the metal of said mono-metal microaggregates is selected from the group consisting of a non-noble metal and a noble metal selected from the group consisting of mercury, palladium, rhodium, ruthenium, osmium and copper, wherein the metal of said multi-metal microaggregate is selected from the group consisting of alloys of non-noble metals, alloys of noble metals and alloys of non-noble metals with noble metals, and wherein said microaggregates have a size which is uniformly less than 5 nm.

2. The mono- or multi-metal microaggregate composition of claim 1, wherein the size of the microaggregates is less than 3 nm.

3. The mono- or multi-metal microaggregate composition of claim 1, wherein the non-noble metal is selected from the group consisting of nickel, cobalt, lead, zinc, iron, antimony, tin and bismuth.

4. The mono- or multi-metal microaggregate composition of claim 1, wherein the microaggregates are in the form of a subcolloidal solution.

5. The mono- or multi-metal microaggregate composition of claim 1, wherein the microaggregates are Fe/Cu, Ni/Ag, Ni/Cu, Ni/Pt, Ni/Pd, Ni/La, Pd/Ag/Au or Pd/Ag/Cu alloys.

6. The mono- or multi-metal microaggregate composition of claim 1, wherein the microaggregates are in the form of a deposit on a support selected from the group consisting of silicas, resins, oxides, zeolites, carbon and insoluble salts selected from the group consisting of strontium titanate and cadmium sulfide.

7. A method for the preparation of a mono- or multi-metal microaggregate composition in homogenous dispersed phases by irradiation of a metal salt, or a mixture of salts, by means of an ionizing radiation source, comprising dissolving a metal salt or a mixture of metal salts, in a suitable solvent, in the presence of an oxidizing radical scavenger, and a surfactant, a support or both a surfactant and a support, and then carrying out irradiation.

8. The method of claim 7, wherein the oxidizing radical scavenger is a primary or secondary alcohol or a formate.

9. The method of claim 8, wherein the alcohol is isopropanol and wherein the formate is an alkaline metal formate.

10. The method of claim 9, wherein the radical scavenger is nickel formate.

11. The method of any one of claim 7 to 10, wherein the surfactant agent is polyvinyl alcohol in a concentration (monomeric) equal to several times that of the metal atoms.

12. The method of any one of claim 7 to 10, wherein the support is selected from the group consisting of silicas, resins, oxides, carbon, zeolites and insoluble salts selected from the group consisting of strontium titanate or cadmium sulfide.

13. The method of claim 7, wherein the pH is above 6.0.

14. The method of claim 13, wherein the pH is between 10 and 11.

15. The method of claim 7, wherein the irradiation is carried out in the presence of oxygen at reduced pressure.

16. The method of any one of claims 7 to 10, wherein the concentration of the metal salt is between $10^{-4}$ and $10^{-1}$ mol/l.

17. The method of any one of claims 7 to 10, wherein palladium or platinum in the form of previously prepared divided metal or in salt form is added in an amount of 0.1 to 2% in atoms of the metal to be reduced.

18. A catalyst for the photoreduction of water into hydrogen characterized in that it is composed of the metal microaggregate composition of any one of claims 1 or 2.

19. The method of claim 7, wherein said irradiation is carried out at a dosage of 50–700 eV per atom of metal.

* * * * *